US008673794B1

(12) United States Patent
Ramachandran et al.

(10) Patent No.: US 8,673,794 B1
(45) Date of Patent: Mar. 18, 2014

(54) MULTIPHASE EUTECTIC CERAMICS

(75) Inventors: Gautham Ramachandran, Fremont, CA (US); Scott W. Smith, San Jose, CA (US); Sanjay Prasad, Mountain View, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 275 days.

(21) Appl. No.: 12/871,358

(22) Filed: Aug. 30, 2010

Related U.S. Application Data

(60) Provisional application No. 61/238,097, filed on Aug. 28, 2009.

(51) Int. Cl.
*C04B 35/52* (2006.01)
*C04B 35/56* (2006.01)
*C04B 35/00* (2006.01)

(52) U.S. Cl.
USPC ............................ 501/87; 501/96.1; 501/96.3

(58) Field of Classification Search
USPC ........... 501/96.1, 96.2, 96.3, 96.4, 87, 88, 90, 501/91, 92, 93
See application file for complete search history.

(56) References Cited

U.S. PATENT DOCUMENTS

| 4,081,284 | A | * | 3/1978 | Prochazka et al. ............... 501/91 |
| 4,595,663 | A | * | 6/1986 | Krohn et al. ................... 501/103 |
| 5,750,450 | A | | 5/1998 | Bull et al. |
| 6,682,580 | B2 | * | 1/2004 | Findeisen et al. ............... 75/236 |
| 2002/0151427 | A1 | | 10/2002 | Tului et al. |
| 2007/0105706 | A1 | * | 5/2007 | Chen et al. ....................... 501/87 |

OTHER PUBLICATIONS

Angelo Bongiorno, et al., "A perspective on Modeling Materials in Extreme Environments: Oxidation of Ultrahigh-Temperature Ceramics", MRS Bulletin, vol. 31, May 2006, pps. 410-418.
Elizabeth C. Dickey, "Fundamental Interface Structure-Property Relationships for High-Temperature Ceramic Composites", Final report for AFOSR Award #F49620-2-1-0211, Dept. of Materials Science and Engineering, The Pennsylvania State University, May 15, 2002-May 14, 2005.
L. Kaufman, "Calculation of Multicomponent Refractory Composite Phase Diagrams", Naval Surface Weapons Center, NSWC TR 86-242, Jun. 1, 1986.
Javier Llorca, Victor M. Orera, "Directionally solidified eutectic ceramic oxides", Progress in Materials Science 51 (2006) 711-809.
Ronald Loehman, Erica Corral, Hans Peter Dumm, Paul Kotula and Rajan Tandon, "Ultra High Temperature Ceramics for Hypersonic Vehicle Applications", Sandia National Laboratories, Sandia Report, SAND 2006-2925, Jun. 2006.

(Continued)

*Primary Examiner* — Noah Wiese
(74) *Attorney, Agent, or Firm* — McDermott Will & Emery LLP

(57) ABSTRACT

Solid material powders are described that include a first compound that is a non-oxide ceramic compound and a second compound that is a non-oxide, in relative amounts with respect to each other to form a eutectic mixture. The solid material has two discrete phases arranged in an interpenetrating three-dimensional microstructure. Methods for preparation of the solid materials, and shaped sintered articles from the materials, along with methods and techniques for their manufacture, are also disclosed.

18 Claims, 1 Drawing Sheet

(56) References Cited

OTHER PUBLICATIONS

Rosa L. Merino, Jose I. Pena, Angel Larrea, German F. de la Fuente and Victor M. Orera, "Melt grown composite ceramics obtained by directional solidification: structural and functional applications", Recent Res. Devel. Mat. Sci., 4 (2003): 1-24 ISBN 81-271-0022-6.

E. Opila, J. Smith, S. Levine, adn J. Lorincz; "Oxidation of ZrB2 SiC TaSi2 Materials at Ultra High Temperatures", NASA Glenn Research Center, Ultra-High Temperature Ceramics Conference, Lake Tahoe, CA Aug. 5, 2008.

Anton V. Polotai, John F. Foreman and Elizabeth C. Dickey, "Laser Surface Processing of B4C-TiB2 Eutectic", Int. j. Appl. Ceram. Technol., 5 [6] 610-617 (2008).

V.S. Stubican and R.C. Bradt, "Eutectic Solidification in Ceramic Systems", Ann. Rev. Mater. Sci. 1981. 11:267-97.

E. Wuchina, E. Opila, M. Opeka, W. Fahrenholtz and I. Talmy; "UHTCs: Ultra-High Temperature Ceramic Materials for Extreme Environment Applications", The Electrochemical Society Interface, Winter 2007, pp. 30-36.

* cited by examiner

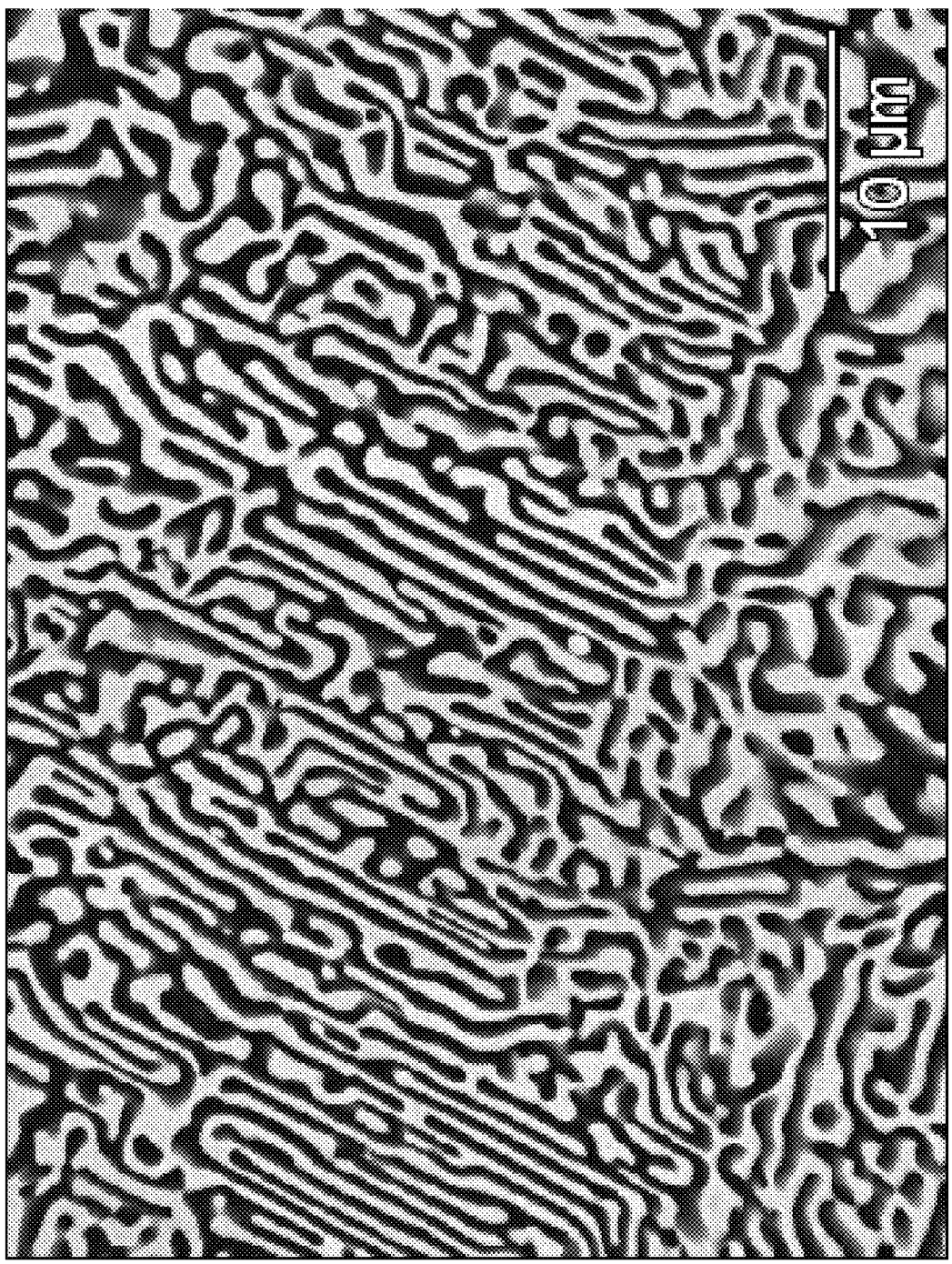

MULTIPHASE EUTECTIC CERAMICS

CROSS-REFERENCES TO RELATED APPLICATIONS

This patent application claims priority to U.S. Provisional Patent Application Ser. No. 61/238,097, filed Aug. 28, 2009 which is incorporated herein by reference in its entirety.

BACKGROUND OF THE INVENTION

The present invention relates generally to ceramics, and more particularly to high toughness multiphase eutectic ceramics.

Ceramic materials such as ultra high temperature ceramics (UHTC's) possess exceptional stability at elevated temperatures and oxidizing environments such as those encountered in spacecraft atmospheric entry and aerospace propulsion applications, but suffer from poor toughness and thermal shock resistance that limit their use in the design of structural components for many such applications. Fiber reinforcement of ceramics is the traditional solution to increase strength and toughness but adds significant manufacturing cost, complexity, and lead time.

Accordingly, it is desirable to provide additional materials that can withstand high temperatures and also provide high strength, toughness, and thermal shock resistance.

SUMMARY OF THE INVENTION

In an exemplary embodiment of the invention, a powder comprising particles of a solid material is provided that include two or more non-oxide compounds, at least one of which is a ceramic, the two or more non-oxide compounds being present in relative amounts with respect to each other to form a eutectic composition mixture, the solid material having two or more discrete phases arranged in an interpenetrating three-dimensional microstructure.

In another exemplary embodiment of the invention, an article of molded sintered particles is provided that where the particles include two or more non-oxide compounds, at least one of which is a ceramic, the two or more non-oxide compounds being present in relative amounts with respect to each other to form a eutectic composition mixture, the solid material having two or more discrete phases arranged in an interpenetrating three-dimensional microstructure.

In yet another exemplary embodiment of the invention, a method of manufacturing a material is provided, comprising the steps of:

preparing a mixture comprising two or more non-oxide compounds, at least one of which is a ceramic, the two or more non-oxide compounds being present in relative amounts with respect to each other to form a eutectic composition mixture;

heating the eutectic composition mixture to form a molten eutectic composition mixture;

cooling the molten eutectic composition mixture to solidify the molten eutectic composition mixture to form a solid material comprising two or more discrete phases arranged in an interpenetrating three-dimensional microstructure; and pulverizing the solid material to form a powder material comprising powder particles that comprise two discrete phases arranged in an interpenetrating three-dimensional microstructure.

In another exemplary embodiment of the invention, a method of manufacturing a shaped sintered article is provided, comprising the steps of:

preparing a mixture comprising two or more non-oxide compounds, at least one of which is a ceramic, the two or more non-oxide compounds being present in relative amounts with respect to each other to form a eutectic composition mixture;

heating the eutectic composition mixture to form a molten eutectic composition mixture;

cooling the molten eutectic composition mixture to solidify the molten eutectic composition mixture to form a solid material comprising two discrete phases arranged in an interpenetrating three-dimensional microstructure;

pulverizing the solid material to form a powder material comprising powder particles that comprise two or more discrete phases arranged in an interpenetrating three-dimensional microstructure;

forming a shaped article from the powder material;

sintering the shaped article; and optionally machining the article to produce a net shape article.

These and other features and benefits will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 depicts a photomicrograph of an exemplary embodiment of the invention of solid material comprising two discrete phases arranged in an interpenetrating three-dimensional microstructure.

DETAILED DESCRIPTION

The invention will be described with reference to specific embodiments, without limiting the same.

Embodiments of the present invention provide simple, low-cost methods of manufacturing high strength, high toughness multiphase ceramics with unique self-assembled microstructures without the cost and complexity of fiber reinforced composites. Embodiments of the present invention are directed to materials systems, processes for manufacturing materials, and processes for manufacturing components comprising these systems.

Embodiments of the present invention are applicable but not limited to structures for extreme environments such as propulsion and aerothermal systems. Examples include but not limited to non-eroding or shape-stable nosetips and control surfaces for hypersonic or atmospheric re-entry vehicles, non-eroding nozzle materials for propulsion systems, erosion-resistant engine materials, structural insulators, damage-tolerant hypervelocity particulate impact structures, and the like.

A key to strength and fracture toughness in fiber or particulate reinforced ceramic composites is engineered interfaces with salient mechanical behavior that inhibits the formation and rapid propagation of cracks under applied stress. Embodiments of the present invention achieve fracture toughness in multiphase ceramics through the formation of eutectic microstructures, i.e. three-dimensional interpenetrating phases with large number of interfaces and commensurately high interfacial surface area. As these microstructures are self-assembled, fabrication of polycrystalline structures of the same is relatively simple when compared to complex fiber reinforced ceramics. The three-dimensional interpenetrating microstructure is illustrated in FIG. 1, which is a micrograph of a material having 45 mole percent $HfB_2$ and 55 mole percent SiC that was prepared mixing $HfB_2$ powder with SiC in the above-mentioned eutectic composition ratio. The material was then cold pressed into pellet shapes, which were heated above the eutectic melting point of 2347° C., followed by cooling to solidify the material, and then pulverizing it into a powder. The powder was hot pressed into a test coupon shop at 2100° and 5 ksi to form a sintered shaped article, which was then subjected to photomicrographic imaging to produce the photomicrograph of FIG. 1. As seen in FIG. 1, the interpenetrating microstructure has two discrete homogeneous phases where each phase has a highly continuous lamellar structure intertwined with the highly continuous lamellar structure of the other phase. The interphase interfaces are nearly atomically abrupt, with no measurable diffusion between the constituents. Due to the differential properties of the two constituents and effects stemming from rapid cool-down from the molten phase, these eutectic microstructures also have unique residual stress fields that contribute to their mechanical behavior. In the embodiment shown in FIG. 1, the interpenetrating eutectic microstructure has a lamellar microstructure. In another exemplary embodiment, the interpenetrating eutectic microstructure can have a rod-shaped configuration.

This structure is readily distinguished from conventional composite microstructures, which typically do not exhibit an interpenetrating lamellar structure, and instead often exhibit randomly interspersed agglomerations of particles or crystal structures, or a continuous primary phase with discrete particles or crystals of a secondary phase dispersed therein. Even when composites are reinforced with oriented fibers, they still do not provide an interpenetrating microstructure.

In exemplary embodiments, non-oxide ceramic compounds may include borides, carbides, silicides, and/or nitrides in a compound with a less electronegative element, including but not limited to hafnium, zirconium, tantalum, titanium, vanadium, chromium, niobium, molybdenum, tungsten, and rhenium. In a more specific exemplary embodiment, the less electronegative element is hafnium, zirconium, or tantalum. Some elements may serve as either the more electronegative or the less electronegative element in a non-oxide ceramic. For example, boron may be the more electronegative element such as in $HfB_2$, $ZrB_2$, or $TaB_2$, or it may be the less electronegative element such as in $B_4C$. Similarly, silicon may be the less electronegative element as with SiC, or it may be the more electronegative element such as $HfSi_2$. In one exemplary embodiment, the non-oxide ceramic compound is $HfB_2$, HfC, $ZrB_2$, ZrC, $TaB_2$, or TaC.

The non-oxide ceramic compound may be mixed with one or more additional non-oxide compounds that will together form a eutectic composition mixture. In an exemplary embodiment, the one or more additional compounds are selected from the group consisting of non-oxide ceramics, carbon, or metals. In another exemplary embodiment, the one or more additional compounds are selected from the group consisting of non-oxide ceramics and carbon. In yet another exemplary embodiment, the one or more additional compounds are each a non-oxide ceramic. In a still further exemplary embodiment, the one or more additional compounds are each a carbide. Examples of compounds that may be mixed with the first non-oxide ceramic compound include but are not limited to SiC, $B_4C$, HfC, ZrC, or C. In one exemplary embodiment, the eutectic combination is a two-compound eutectic combination. Examples of eutectic combinations that may be used in exemplary embodiments of the invention include, but are not limited to $HfB_2$/SiC (45/55 mole % ratio), $HfB_2$/HfC (66/34 mol % ratio), $HfB_2$/$B_4C$ (22/78 mole % ratio), $HfB_2$/C (62/38 mole % ratio), HfC/SiC (28/72 mole % ratio), $ZrB_2$/SiC (55/45 mole % ratio), $ZrB_2$/ZrC (68/32 mole % ratio), $ZrB_2$/$B_4C$ (35/65 mole % ratio), $ZrB_2$/C (67/33 mole % ratio), or ZrC/SiC (42/58 mole % ratio), and in an exemplary embodiment, the first and second compounds make up one of these combinations. In another exemplary embodiment the first and second compounds are $HfB_2$/SiC (45/55 mole % ratio) or $ZrB_2$/SiC (55/45 mole % ratio. The mole percentage ratios described above may be varied by modest amounts, provided that it does not lead to the formation of dendrites in one of the phases thereby disrupting the interpenetrating microstructure, and the term "eutectic" as used herein is intended to accommodate such compositional variations the true eutectic composition that do not disrupt the interpenetrating microstructure.

In an exemplary embodiment, a material is prepared by first mixing powders (e.g., having particle sizes of less than 44 μm) of a first non-oxide ceramic compound with a second non-oxide compound in eutectic amounts with respect to one another. The powder mixture may be cold pressed or cold isostatic pressed into a convenient shape for handling, and an optional binder as known in the ceramic art may be used to help hold the shape for handling. The pellets may also be pre-sintered at temperatures up to 2000° C. for durations up to 12 hours for improved handleability. Alternatively, the powder mixture may simply be held in a mold or crucible capable of withstanding the melting temperature of the eutectic composition mixture. The mixture is then heated above its eutectic melting point, followed by cooling and re-solidification, which results in the formation of a polycrystalline multiphase interpenetrating three-dimensional microstructure. Heating may be performed in a high-temperature furnace or cold-pressed shapes such as pellets may be arc-melted. Other heating options include laser heating, microwave heating, plasma arc heating, and the like. In an exemplary embodiment, the rate of cooling may be controlled to affect certain properties of the microstructure, such as the interphase spacing. In one exemplary embodiment, the interphase spacing is less than 1 μm.

Additives may be included with the eutectic composition mixture prior to melting in order to control properties such as crystal size and growth and interfacial characteristics, in small amounts (e.g., less than 5%), as is well-known in the art, provided that they do not disrupt the eutectic properties and formation of the multi-phase interpenetrating three-dimensional microstructure. Such additives may include, but are not limited to carbon additives, certain oxides, and the like known to be used, for example, sintering aids or phase stabilizers.

In an exemplary embodiment, after the eutectic material has been cooled and solidified, it is pulverized into a powder, such as by known processes such as ball milling in volatile solvent, grinding, crushing, jet milling, and the like. In further exemplary embodiments, the particle size of the powder may any particle size known to be useful for ceramic molding. In a more specific exemplary embodiment, the particle size may be less than 44 μm. This powder may then be used to form articles such as net-shape articles by manufacturing techniques known to be useful for non-oxide ceramics such as UHTC's. Such techniques generally involve hot pressing or hot isostatic pressing at temperatures of from 1000° C. to 2500° C. and pressures of from 1 ksi to 10 ksi, thermal spray, laser assisted sintering, spark plasma sintering, and the like.

These high temperature processes yield dense product with the eutectic microstructure described above. In some embodiments, the powder may be mixed with a solvent to form a paste, which can then be inserted into a mold, followed by drying and then hot-pressing. In other embodiments, the powder may be mixed with a binder and a solvent (e.g., a polymeric binder such as polystyrene), followed by evaporation of the solvent, which may allow for alternative molding techniques such as injection molding to form a green ceramic part, followed by sintering at temperatures as described above. In such embodiments, the binder generally converts to carbon during the sintering process. Other techniques for manufacturing ceramic parts are disclosed in, for example, Introduction to Ceramics, W. D. Kingery, H. K. Bowen, & D. Uhlman, $2^{nd}$ ed., 1976, John Wiley & Sons, or Introduction to the Principles of Ceramic Processing, J. Reed, 1988, John Wiley & Sons, the disclosure of each of which is incorporated herein by reference in its entirety.

The post-melt phase eutectic powder described above may be used to fabricate a variety of components, including net-shape and near net-shape component fabrication, utilizing a variety of powder consolidation and densification methods as is known in the art, and also described in the above-referenced Kingery et al. and Bowen references. Post consolidation machining processes (e.g., cutting, grinding, drilling, routing, and other machining techniques, using high-hardness machining tools like diamond-coated tools capable of machining the components) can be used to form components with complex geometries and tight tolerances on final dimensions.

Engineered eutectics in multiconstituent ceramic systems comprising the materials described herein may be capable of surviving extreme environments at high temperatures. Furthermore, exemplary embodiments described herein yield polycrystalline eutectic components of high strength and toughness, and eliminate the need for the complex processing associated with single crystal formation. While not being bound by any particular theory or explanation, this high strength is believed to be at least in part due to the unique capability of the polycrystalline multi-phase interpenetrating three-dimensional microstructure to terminate and/or deflect the propagation of stress-induced micro-cracks at the interphase boundaries.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A powder comprising particles of a solid material comprising two or more non-oxide compounds, a first one of said two or more non-oxide compounds being a non-oxide ceramic compound, the two or more non-oxide compounds being present in relative amounts with respect to each other to form a eutectic composition mixture, the solid material comprising at least two discrete phases, each phase having a continuous lamellar structure,
wherein the continuous lamellar structure of a first phase is interpenetrating with the continuous lamellar structure of a second phase, the continuous lamellar structures being arranged in a three-dimensional microstructure that is interpenetrating in all three dimensions and contains randomly oriented lamellae.

2. The powder of claim 1, wherein each of said discrete phases comprises a different one of said two or more non-oxide compounds.

3. The powder of claim 1, wherein the two or more non-oxide compounds other than said first compound are each selected from the group consisting of non-oxide ceramics, carbon, and metals.

4. The powder of claim 1, wherein the solid material comprises a first compound selected from the group consisting of $HfB_2$, HfC, $ZrB_2$, ZrC, $TaB_2$, and TaC, and a second compound selected from the group consisting of SiC, $B_4C$, HfC, ZrC, and C.

5. The powder of claim 4, wherein the eutectic composition mixture of the first and second compounds is selected from the group consisting of $HfB_2$/SiC (about 45/55 mole % ratio), $HfB_2$/HfC (about 66/34 mol % ratio), $HfB_2$/$B_4C$ (about 22/78 mole % ratio), $HfB_2$/C (about 62/38 mole % ratio), HfC/SiC (about 28/72 mole % ratio), $ZrB_2$/SiC (about 55/45 mole % ratio), $ZrB_2$/ZrC (about 68/32 mole % ratio), $ZrB_2$/$B_4C$ (about 35/65 mole % ratio), $ZrB_2$/C (about 67/33 mole % ratio), and ZrC/SiC (about 42/58 mole % ratio).

6. The powder of claim 5, wherein the eutectic composition mixture of the first and second compounds is $HfB_2$/SiC (about 45/55 mole % ratio) or $ZrB_2$/SiC (about 55/45 mole % ratio).

7. The powder of claim 1, wherein the three-dimensional microstructure has an interphase spacing of less than 10 μm.

8. The powder of claim 1, wherein the three-dimensional microstructure has an interphase spacing of less than 1 μm.

9. An article comprising molded sintered particles of a solid material comprising two or more non-oxide compounds, a first one of said two or more non-oxide compounds being a non-oxide ceramic compound, the two or more non-oxide compounds being present in relative amounts with respect to each other to form a eutectic composition mixture, the solid material comprising at least two discrete phases, each phase having a continuous lamellar structure, wherein the continuous lamellar structure of a first phase is interpenetrating with the continuous lamellar structure of a second phase, the continuous lamellar structures being arranged in a three-dimensional microstructure that is interpenetrating in all three dimensions and contains randomly oriented lamellae.

10. The article of claim 9, wherein each of said discrete phases comprises a different one of said two or more non-oxide compounds.

11. The article of claim 9, wherein the two or more non-oxide compounds other than said first compound are each selected from the group consisting of non-oxide ceramics, carbon, and metals.

12. The article of claim 9, wherein the article comprises a first compound selected from the group consisting of $HfB_2$, HfC, $ZrB_2$, ZrC, $TaB_2$, and TaC, and a second compound selected from the group consisting of SiC, $B_4C$, HfC, ZrC, and C.

13. The article of claim 12, wherein the eutectic composition mixture of the first and second compounds is selected from the group consisting of $HfB_2$/SiC (about 45/55 mole % ratio), $HfB_2$/HfC (about 66/34 mol % ratio), $HfB_2$/$B_4C$ (about 22/78 mole % ratio), $HfB_2$/C (about 62/38 mole % ratio), HfC/SiC (about 28/72 mole % ratio), $ZrB_2$/SiC (about 55/45 mole % ratio), $ZrB_2$/ZrC (about 68/32 mole % ratio), $ZrB_2$/$B_4C$ (about 35/65 mole % ratio), $ZrB_2$/C (about 67/33 mole % ratio), and ZrC/SiC (about 42/58 mole % ratio).

14. The article of claim 13, wherein the eutectic composition mixture of the first and second compounds is $HfB_2$/SiC (about 45/55 mole % ratio) or $ZrB_2$/SiC (about 55/45 mole % ratio).

15. The article of claim 9, wherein the three-dimensional microstructure has an interphase spacing of less than 10 μm.

16. The article of claim 9, wherein the three-dimensional microstructure has an interphase spacing of less than 1 μm.

17. A manufacturing method, comprising the steps of:

preparing a mixture comprising two or more non-oxide compounds, a first one of said two or more non-oxide compounds being a non-oxide ceramic compound, the two or more non-oxide compounds being present in relative amounts with respect to each other to form a eutectic composition mixture;

heating the eutectic composition mixture to form a molten eutectic composition mixture;

cooling the molten eutectic composition mixture to solidify the molten eutectic composition mixture and form a solid material comprising at least two discrete phases, each phase having a continuous lamellar structure, wherein the continuous lamellar structure of a first phase is interpenetrating with the continuous lamellar structure of a second phase, the continuous lamellar structures being arranged in a three-dimensional microstructure that is interpenetrating in all three dimensions and contains randomly oriented lamellae; and pulverizing the solid material to form a powder material comprising powder particles that retain the three-dimensional microstructure.

18. The method of claim 17, further comprising the steps of:

forming a shaped article from the powder material;

sintering the shaped article; and optionally, machining the shaped article to produce a net shape article.

* * * * *